Jan. 16, 1968  R. K. HILL  3,364,407
BRUSHLESS DIRECT CURRENT MOTOR
Filed Oct. 8, 1962  5 Sheets-Sheet 1

INVENTOR.
ROY K. HILL
BY
Raymond R. Skolnick

INVENTOR.
ROY K. HILL
BY
Raymond R. Skolnick

United States Patent Office 3,364,407
Patented Jan. 16, 1968

3,364,407
BRUSHLESS DIRECT CURRENT MOTOR
Roy K. Hill, Bristol, Tenn., assignor to Sperry Rand Corporation, Sperry Farragut Company Division, Bristol, Tenn., a corporation of Delaware
Filed Oct. 8, 1962, Ser. No. 228,849
9 Claims. (Cl. 318—138)

This invention relates to direct current, energized motors in general, and more particularly relates to a motor having the operating characteristics of a conventional D.C. motor; yet is constructed so that commutation takes place without utilizing wearing surfaces, sliding surfaces, separable contacts or contact devices having relatively movable parts which physically engage one another.

In a conventional direct current machine, commutation is essentially a mechanical switching operation by which currents through the various armature conductors are cyclically reversed in sequence as a function of rotor position. This continuous switching process is accomplished by means of brushes and a segmented commutator so that commutation is unavoidably accompanied by friction, wear, and sparking with its attendant generation of R.F. noise. These disadvantages of commutation frequently prohibit the utilization of D.C. motors in critical applications even though the performance characteristics and input requirements favor the use of a D.C. motor in all other respects.

The prior art has produced a number of brushless D.C. machines, but it is believed that none of the prior art devices provide the performance characteristics of a conventional commutation D.C. machine. That is, these machines either convert direct current to alternating current to effectively provide an A.C. motor or else rotor velocity is employed for switching control. In either event, the result is not a duplication of direct current motor performance. The instant invention provides a D.C. motor having the desirable characteristics of a conventional commutating machine, but does not require relatively moving parts in physical engagement in order to achieve commutation. Further, rotor position is detectible even with the machine at standstill so that current switching control is independent of rotor velocity.

In the preferred embodiment of the instant invention, conventional commutation is simulated by an optical sensing system in conjunction with an electronic switching network. This optical electronic system is capable of reversing and advancing armature currents in sequence as a function of rotor position. The motor utilizes a permanent magnet rotor for field excitation in combination with a stator comprising conventional D.C. armature windings.

A light source fixed to the motor frame has the beam thereof directed through an aperture in a shield carried by the rotor and rotatable therewith. The light beam passing through the shield aperture impinges upon at least one of a number of photoelectric devices spaced around the shield so that as the rotor rotates, the light beam scans the photoelectric devices in sequence. As the photoelectric devices are illuminated, the impedance level of a circuit controlled thereby is lowered so that it acts as a closed switch permitting current to pass through appropriate stator windings in the appropriate direction.

The number of photoelectric devices provided is equal to the number of commutator bars which would normally be required for a similar armature winding of a conventional D.C. machine. As the rotor rotates, a particular photoelectric device is illuminated causing particular armature windings to be energized. The energized windings are positioned so that the magnetic fields generated thereby cooperate with the field of the permanent magnet to cause rotation of the rotor in the required direction.

Accordingly, a primary object of the instant invention is to provide a novel construction for a brushless D.C. machine.

Another object is to provide a brushless D.C. machine having the characteristics of a conventional commutating D.C. machine.

Still another object is to provide means whereby a sequence of electrical signals are determined by rotor position independent of rotor speed.

A still further object is to provide a D.C. machine in which commutation is achieved by electronic switching means without the necessity of utilizing relatively moving parts which physically engage one another.

A still further object is to provide a D.C. motor in which commutation is achieved by means of radiation detecting devices.

Yet another object is to provide a D.C. machine in which switching signals are coupled to the commutating device by means of a field acting through an air gap.

These as well as other objects of this invention shall become readily apparent after reading the following description of the accompanying drawings in which.

Figure 1:
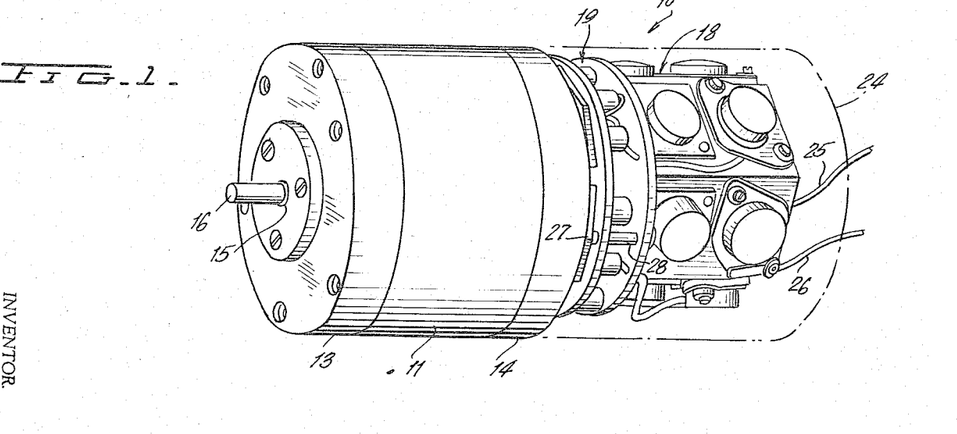
FIGURE 1 is a perspective of a brushless D.C. machine constructed in accordance with the teachings of the instant invention.
Figure 2:
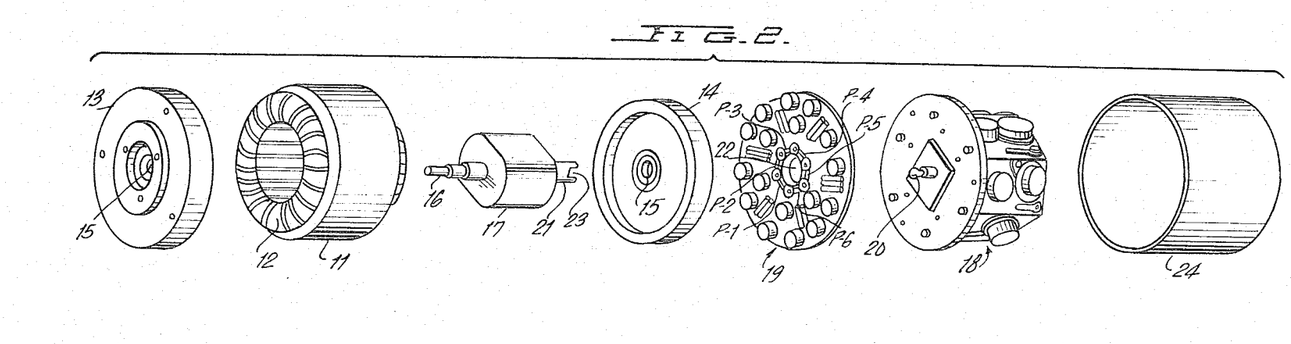
FIGURE 2 is an exploded perspective of the machine of FIGURE 1.
Figure 3:
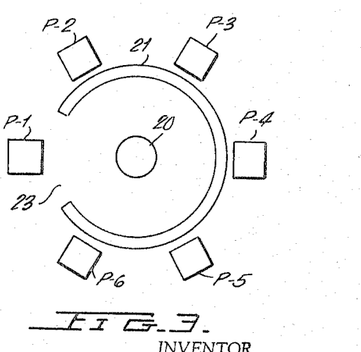
FIGURE 3 is a schematic representation of the rotor position detecting portion of the motor illustrated in FIGURES 1 and 2.

Now referring to FIGURES 1-5 and more particularly to FIGURE 2. Brushless D.C. motor 10 comprises shell 11 which surrounds stationary armature 12. The ends of shell 11 are covered by front and back end caps 13, 14, respectively, each provided wtih suitable bearings 15 which rotatably support motor shaft 16. Rotor 17 is a permanent magnet keyed to shaft 16 and disposed within armature 12.

Commutation is achieved by means of solid state power switching unit 18 and solid state control and preamplifier unit 19 controlled by light source 20 and shield 21. Units 18 and 19 are mounted to the rear of end cap 14 being operatively positioned by means of appropriate spacers 27, 28. Preamplifier unit 19 includes a plurality of photoelectric devices P-1 through P-6 equally spaced from one another and circularly arranged about shield 21.

Light source 20 is mounted to power switching unit 18 on the forward side thereof and extends through central aperture 22 of preamplifier unit 19 into the interior of shield 21. Shield 21 is keyed to motor shaft 16 and is disposed rearwardly of end cap 14 extending through aperture 22. Shield 21 is provided with an aperture 23 so positioned and shaped that light emanating from source 20 and passing through aperture 23 will impinge upon at least one of the photoelectric devices P-1 through P-6 for any position of rotor 17.

Cover 24 is provided as an enclosure for the elements to the rear of end cap 14. An appropriate aperture not shown is provided through cover 24 to permit the passage of leads 25, 26 for connecting motor 10 to a source of direct current.

Figure 4:
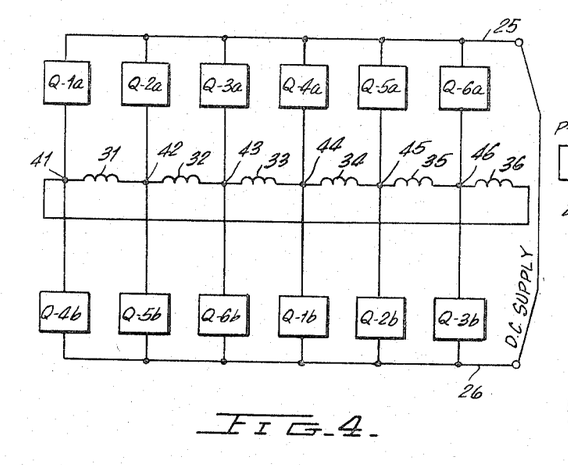
FIGURE 4 is a schematic illustrating the stator windings and their connections to the D.C. energizing source through the electronic switching devices typically illustrated in FIGURE 5.
Figure 5:
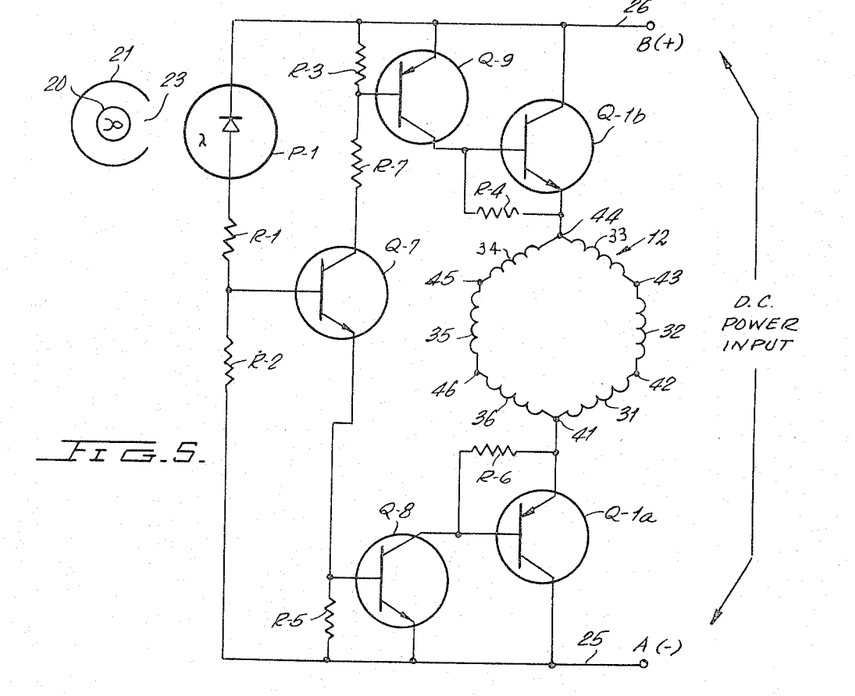
FIGURE 5 is a schematic illustrating one of the six photoelectric switching units of FIGURE 4.

As schematically illustrated in FIGURES 4 and 5, the conducting portion of armature 12 comprises six windings 31 through 36 serially connected to form a closed loop. FIGURE 5 illustrates the current conditions through armature 11 when photoelectric device P-1 is illuminated, as will be more fully explained hereinafter. At this time, winding junctures 41 and 44 are essentially connected directly to leads 25, 26 which in turn are connected to the negative and positive terminals of a D.C. power source. Under these circumstances, two parallel current paths exist between junctures 41 and 44. One path consists of windings 34, 35, 36 connected in series and the other path consists of windings 33, 32, 31 connected in series.

Photoelectric device P-1 is of a type well-known to the art which possesses two states of conduction. That is, low conductance or high impedance when not illuminated and high conductance or low impedance when illuminated. Since the position of rotor 17 determines the position of shield slit 23, the position of rotor 17 determines whether or not P-1 is illuminated.

When P-1 is illuminated there is a relatively low impedance current path from lead 25 through the emitter to base junction of NPN type transistor Q-8, through the emitter to base junction of NPN type transistor Q-7 through resistor R-1 and P-1 to lead 26. This emitter to base current of Q-7 is sufficient to create a low impedance path from emitter to collector of Q-7. Consequently, a second larger current flows in the now relatively low impedance path from lead 25 through the emitter to base junction of Q-8, from the emitter to collector of Q-7 through R-7, through the base to emitter junction of PNP type transistor Q-9 to lead 26.

When this second current flows a low impedance condition is created from the emitter to collector of Q-8 and from the collector to emitter of Q-9. A third and still larger current flows through the now relatively low impedance path from lead 25 to the emitter Q-8, from the emitter to collector of Q-8, from the base to emitter junction of PNP type transistor Q-1a, through the windings of armature 11 from juncture 41 to juncture 44 through the emitter to base of NPN type transistor Q-1b, thence from the collector to emitter of Q-9 to lead 26.

A fourth and still larger current flows in the now relatively low impedance path from lead 25, from collector to emitter of Q-1a, through armature 11 between juncture 41 and 44, thence from emitter to collector of Q-1b to lead 26.

These four current paths drop in impedance in a rapid almost instantaneous sequence with a switching time in the order of microseconds which is an insignificant portion of the conducting time for photoelectric device P-1.

R-1 and R-2 are connected between photoelectric device P-1 and lead 25 with the juncture between these resistors being connected to the base of Q-7. Resistor R-5 is connected between the emitter of Q-7 and lead 25 while resistor R-3 is connected between the base of Q-9 and lead 26. Resistor R-7 is connected between collector of Q-7 and base of Q-9. Resistor R-4 is connected between the emitter and base of Q-1b while resistor R-6 is connected between the emitter and base of Q-1a. The purpose of R-2 through R-6 is a well known and practiced art. They offer better stabilization of the associated transistors by shunting some of the transistor's leakage current around the base-emitter junction.

The current between junctures 41 and 44 produces a magnetic flux oriented to be essentially in spaced quadrature with the flux of rotor 17. When rotor 17 is rotated for 360° divided by the number of switching legs used, in this case six, shield 21 is advanced so that light directed through aperture 23 illuminates photoelectric device P-2 of a circuit identical to that of FIGURE 5. However, as seen in FIGURE 4, this circuit connects the armature windings so that current now flows in two parallel paths between junctures 42 and 45. Aperture 23 is wide enough to always illuminate at least one of the photoelectric devices P-2 through P-6 with a small overlap. This is typical of commutation in conventional D.C. machines and assures that armature 11 will be energized on starting for all positions of shaft 16.

As should now be apparent, there are six different circuits identical to that of FIGURE 5. Essentially, only one of these circuits is active at any given time. It is the active circuit which determines the current path through the windings of armature 11. This arrangement is schematically illustrated in FIGURE 4. As seen from the description of FIGURE 5, Q-1a and Q-1b conduct simultaneously. Similarly there is a simultaneous conduction of transistors Q-2a and Q-2b, simultaneous conduction of Q-3a and Q-3b, and so on.

To insure deep saturation of transistors Q-1a and Q-1b, an alternate connection can be made. The emitter of Q-9 can be connected to the base of PNP transistor, Q-1a and the emitter of Q-8 can be connected to the base of NPN transistor, Q-1b, the collector of Q-9 being connected directly to juncture 45 and the collector of Q-8 being connected directly to juncture 42. The collector of Q-1b can be connected to juncture 41 and the emitter of Q-1b can be connected to line 25 with the collector of Q-1a being connected to juncture 44 and the emitter of Q-1a being connected to line 26. Resistors R-4 and R-6 can be connected between emitter and base of transistors Q-1a and Q-1b, respectively.

Figure 6:
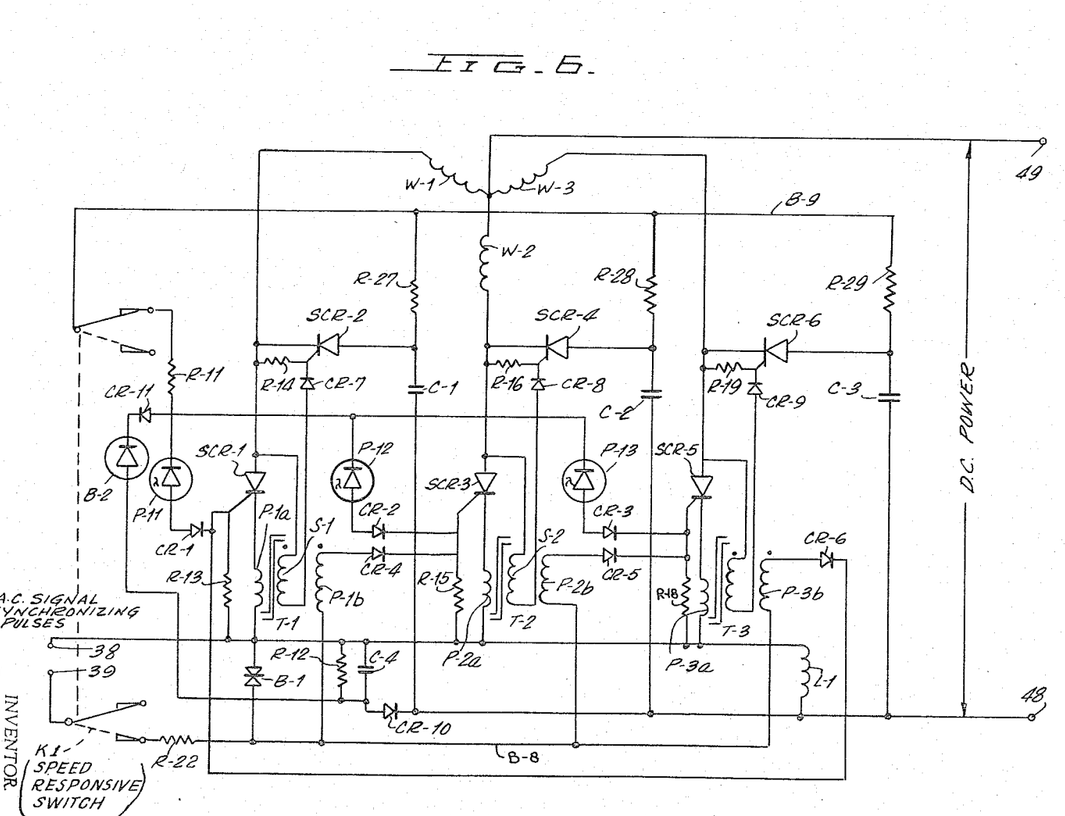
FIGURE 6 is a schematic illustrating another embodiment of the instant invention utilizing silicon control rectifiers.

FIGURE 6 illustrates another embodiment of this invention which utilizes silicon controlled rectifiers and is especially adapted for synchronous operation. As is well known to the art, a silicon controlled rectifier is a form of transistor with internal feedback and possesses the characteristic of remaining non-conducting until triggered into conduction and thereafter remaining in a state of conduction until turned off and allowed to recover to a forward blocking condition. The utilization of transistors to simulate the action of silicon controlled rectifiers would require a good deal of complex circuitry external to the transistor. The memory characteristics of the silicon controlled rectifier to remain conducting once triggered, simplifies the circuit for a synchronous version of a brushless direct current motor.

In the device of FIGURE 6, as in the device of FIGURES 1 through 5, when power is applied, one or more of the rotor position sensing photoelectric devices will be illuminated. For purposes of explanation assume that P-11 is initially illuminated. Gate current will now flow in silicon controlled rectifier SCR-1 triggering it into the conducting state. This causes current flow through the primary P-1a, of iron core transformer T-1, of sufficient magnitude to cause core saturation. This change of state of the transformer core causes a positive pulse developed in secondary S-1 to be coupled through crystal diode CR-7 thereby triggering silicon controlled rectifier SCR-2 into conduction. Prior to this occurrence a charge has been stored on capacitor C-1. Upon conduction of rectifier SCR-2 the charge on C-1 will discharge through inductance L-1, primary winding P-1a, rectifier SCR-1 and rectifier SCR-2.

The decaying voltage of capacitor C-1, less the small voltage drops across elements P-1, SCR-1 and SCR-2, will appear across inductance L-1. This decaying voltage across inductance L-1 is in series opposition to the supply voltage appearing between terminals 48 and 49 and is thereby effective to turn off any other of the silicon controlled rectifiers SCR–3 through SCR–6 which may be in a conducting state.

This establishes a relatively low impedance conducting path between terminals 48 and 49 through armature winding W–1. The current through W–1 will produce a magnetic field which cooperates with the flux field of the permanent magnet rotor to produce a torque causing rotation of the motor shaft. It is noted that winding W–1 is one of the three windings W–1 through W–3 constituting the armature in the embodiment of FIGURE 6. One end of each winding W–1 through W–3 is connected to motor energizing terminal 49 while the other ends of windings W–1 through W–3 are connected to the anodes of silicon controlled rectifiers SCR–2, SCR–4 and SCR–6, respectively.

After sufficient rotation of the motor shaft, photoelectric device P–12 will be illuminated and cause current through the gate of silicon controlled rectifier SCR–3 triggering it into conduction. The current through rectifier SCR–3 saturates the core of transformer T–2 producing a positive pulse in secondary S–2 which is coupled through crystal rectifier CR–8 and triggers silicon controlled rectifier SCR–4 into conduction. Capacitor C–2 then discharges through inductance L–1, primary winding P–2a of transformer T–2, and silicon controlled rectifiers SCR–3 and SCR–4 causing a voltage drop across inductance L–1 which applies reverse bias to rectifier SCR–1 turning it off.

Rectifier SCR–2 will return to its non-conducting state simultaneously with rectifier SCR–1 becoming non-conducting, or when the counter electromotive force of winding W–1 applies a reverse bias after 180° of rotor rotation.

The illumination of photo sensitive device P–13 acts to saturate the core of transformer T–3 thereby producing a pulse in S–3 effective in conjunction with the other circuit elements to energize armature winding W–3 and deenergize windings W–1 and W–2.

Capacitor C–4, resistor R–12, crystal rectifiers CR–10, CR–11 and zener diode B–2 form a pulse network feedback circuit to remove the supply voltage to photo sensitive devices P–11, P–12 and P–13 immediately and for a short duration after a commutating capacitor C–1, C–2 or C–3 discharges through inductance L–1 to turn off other elements. The removal of supply voltage from the photoelectric devices insures turn off which might not otherwise have occurred due to slight overlapping of the illumination of the photosensitive devices. The time constant of resistor R–12, capacitor C–4 and the threshold level of zener diode Z–2 are chosen to remove the photo sensitive device supply voltage for approximately one-half the period between successive switching events at the highest motor speed to be encountered.

After the motor of FIGURE 6 has been accelerated to a desired speed, operation may be synchronized at this speed by introducing appropriately timed synchronizing pulses at terminals 38 and 39. It is noted that synchronizing pulses introduced at terminals 38 and 39 will not be effective until K–1 assumes the dotted line position of FIGURE 6. K–1 is a switching device which is energized by a speed sensing circuit after the motor has accelerated to synchronous speed. While K–1 is illustrated as a mechanical device for the sake of simplicity, K–1 may and probably would take the form of an electronic switch.

The synchronizing pulses appearing at terminal 38, 39 are coupled through resistor R–22 and crystal rectifiers CR–4, CR–5, CR–6 to other primary windings P–1b, P–2b, P–3b, respectively of transformers T–1, T–2, T–3, respectively. It is noted that once the motor of FIGURE 6 is operating at or above synchronous speed, photo sensitive devices P–11 and P–12 and P–13 are no longer active since they are now disconnected from their energizing source.

B–1 designates a pair of zener diodes connected back-to-back to form a clipper for the synchronizing pulses. Clipper B–1 is connected from terminal 38 to the end of resistor R–22 which is remote from terminal 39.

As is well-known to the art, crystal rectifiers CR–1 through CR–3, connected in the cathode circuits of photoelectric devices P–11 through P–13, respectively, are used in a conventional manner for blocking purposes. Similarly, resistors R–27, R–28 and R–29, connected from bus B–9 to capacitors C–1, C–2 and C–3, respectively, are utilized to provide a path for charging capacitors C–1, C–2 and C–3 and for current limiting purposes. The purpose of resistors R–14, R–16, R–19, R–13, R–15 and R–18, in the gating circuits of the silicon controlled rectifiers is a well-known and practiced art. They shunt some of the device leakage current around the gate-cathode junction, improving the stability of the SCR's.

Thus, it is seen that in the embodiment magnetic core transformers T–1 through T–3 in cooperation with triggered devices (the silicon controlled rectifiers) are utilized to gate recurring pulses at common bus B–8 to progressive distribution points. The current of a previously triggered device passes through one winding on the core to saturate this core. The impedance of a second winding on this core becomes lowered when the core saturates and routes or gates the next occurring pulse from the common bus to the next progressively wired device.

A motor constructed in accordance with the teachings of FIGURE 6 has the advantage that at starting, up to synchronous speed, the motor, though brushless, possesses the operating characteristics of a D.C. motor having conventional brush-type commutating means. Once synchronous speed has been reached, this speed is maintained by the synchronizing pulses.

Figure 7:
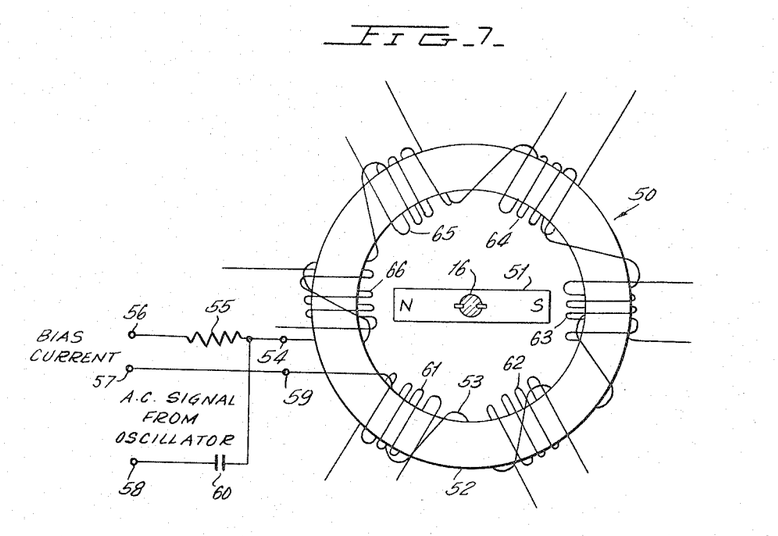
FIGURE 7 is a schematic illustrating still another embodiment of this invention utilizing a saturable core transformer.

The embodiment of this invention illustrated in FIGURE 7 utilizes a saturable core transformer 50 to sense rotor position and achieve current switching for the motor armature. In this embodiment, the light shield of FIGURE 2 is replaced by bar magnet 51 which is mounted in the plane of saturable torroid core 52. Core 52 is provided with winding 53 wound about and extending along the full length of core 52. Winding terminal 54 is connected to one end of resistor 55 whose other end is connected to terminal 56. The other winding terminal 59 is connected directly to terminal 57. A source of D.C. bias current is connected directly across terminals 56, 57. An A.C. signal derived from an oscillator is applied across terminals 57, 58 and is introduced through capacitor 60 to winding 53. A number of lump secondary coils 61 through 66 are equally spaced around core 52, there being one secondary coil for each winding of the armature in question.

Core 52 and magnet 51 are so positioned that the field of magnet 51 extends through a part of core 52. The D.C. current applied at terminals 56 and 57 through winding 53 establishes a bias level to core 52 such that when the bias and magnet flux are added, one side of the core 52 will saturate. On the other side of core 52, the bias and rotor flux will be in opposition bringing this portion of core 52 well out of the knee of saturation. This produces a difference in output for secondary coils 61 through 66.

This difference in output is utilized to sense rotor position by passing a signal above a pre-established threshold value. This signal may be used directly or may be rectified and used to effect current switching by electronic means of the type previously described to produce a rotating magnetic field whose position is related to rotor position.

Figure 8:
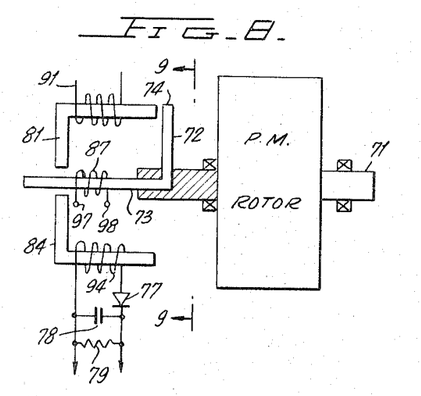
FIGURE 8 is a schematic of yet another embodiment of this invention in which switching signals are magnetically coupled to the commutating devices.

FIGURE 8 illustrates another embodiment of this invention in which motor shaft 71 carries L-shaped member 72 constructed of magnetic material. Leg 73 of member 72 extends from one end of shaft 71 along the axis thereof while the other leg 74 is of fan shape and is positioned to sweep past a number of circularly arranged L-shaped pole pieces 81 through 86. Individual secondary windings 91 through 96 are provided for pole pieces 81 through 86, respectively. A single primary winding 87 surrounds leg 73 of member 72. One of the pole faces of each of the pole pieces 81 through 86 is positioned in magnetic coupling relationship to leg 73. The other pole faces of members 81 through 86 are circularly arranged and are positioned so that as shaft 71 rotates, leg 74 of member 72 will at all times be in magnetic coupling relationship with at least one of these latter mentioned pole pieces.

Figure 9:
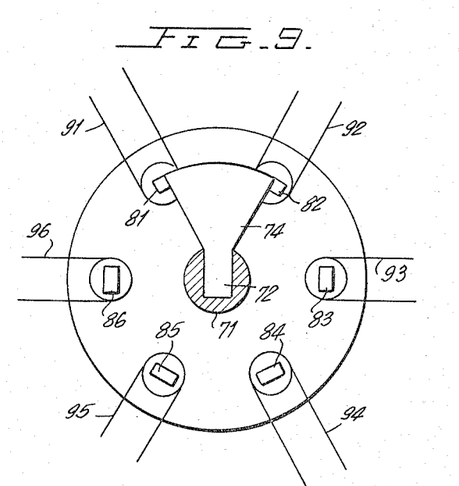
FIGURE 9 is a cross-section taken through line 9—9 of FIGURE 8 looking in the direction of arrows 9—9 with certain elements removed for the sake of clarity.

With the elements in the position of FIGURES 8 and 9, it is seen that leg 74 partly overlies the pole faces of pole pieces 81 and 82. Under these circumstances, two relatively low reluctance paths exist. One comprising member 72 and pole piece 81 and the other comprising member 72 and pole piece 82. A signal from an electronic oscillator (not shown) is introduced at terminals 97, 98 of primary 87 with this oscillator signal being coupled to secondary windings 91 and 92. At this time, there is no output from secondary windings 93 through 96. The signals introduced in the secondary windings may be used directly to effect switching operations or may be converted to a D.C. signal by elements 77 through 79 in the illustration of FIGURE 8.

Figure 10:
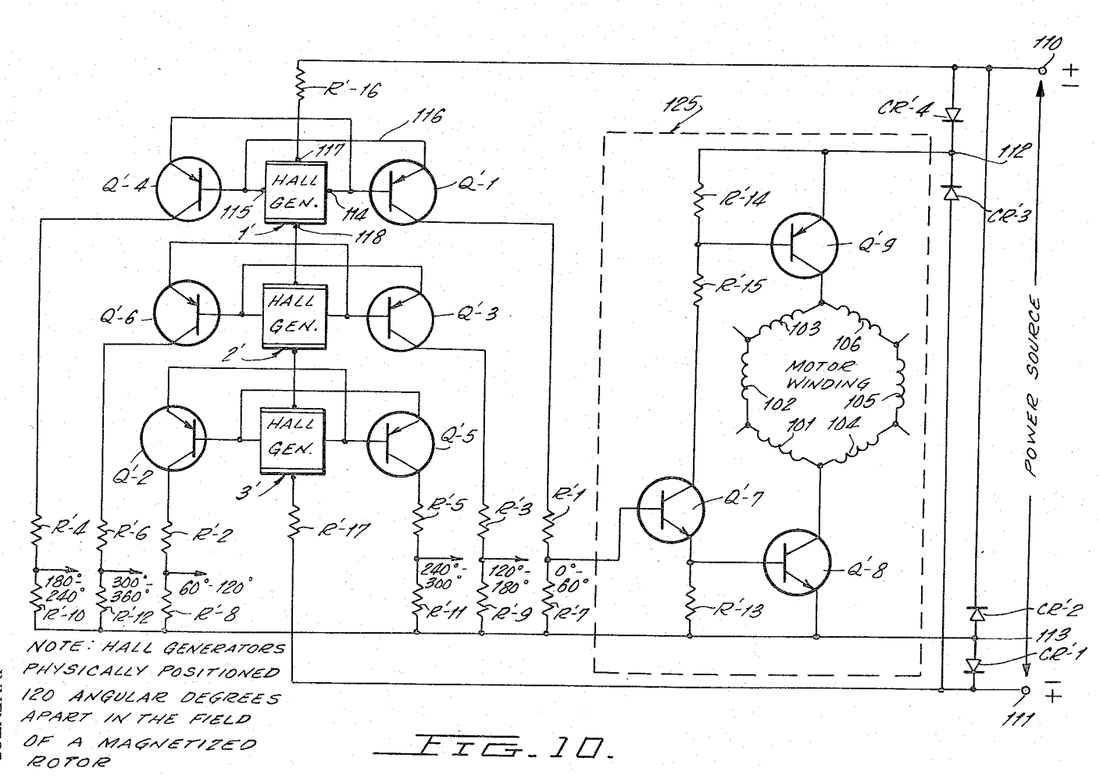
FIGURE 10 is a schematic illustrating an embodiment of this invention utilizing Hall effect generators for detecting rotor position.

FIGURE 10 illustrates an embodiment of this invention in which rotor position is sensed by utilizing Hall effect generators in conjunction with a permanent magnet affixed to the motor shaft. Hall effect generators produce an output potential when there is a D.C. current flow through the generator in a direction perpendicular to a magnetic field through the generator. In the embodiment of FIGURE 10, the output potential of a Hall effect generator is utilized to control the operation of a transistor amplifier to operate this amplifier as an ON-OFF switch.

Hall effect generators 1', 2' and 3 are circularly arrange about the motor shaft and are equally spaced from one another so that they are spaced 120° apart. A permanent magnet (not shown) carried by the motor shaft generates flux which passes through at least one of the Hall effect generators 1', 2', 3' for any position of the rotor. Thus, as the motor shaft rotates Hall effect generators 1', 2', 3' are sequentially scanned by magnetic flux, first with flux in one direction and then with flux in the opposite direction for each complete revolution of the motor shaft.

The path for control current extends from input terminal 110, resistor R'-16, the input terminals 117, 118 of each Hall generator 1', 2', 3' and resistor R'-17 to the other input terminal 111. Resistors R'-16 and R'-17 are of equal value and serve the purpose of fixing the control current at a predetermined value and also tie the output of each Hall device at approximately the midpoint with respect to input terminals 110, 111. The latter is done so that no matter what polarity is connected to terminals 110, 111 transistors Q'-1 through Q'-6 will have operating voltage.

Rectifiers CR'-1 through CR'-4 are arranged as a bridge rectifier whose input terminals are connected to terminals 110, 111. This arrangement produces a potential at terminal 112 which is positive with respect to the potential at terminal 113 regardless of the polarity of the input voltage.

At a time when there is no potential appearing at input terminals 110, 111, there is no output from any of the Hall effect generators, since there is no forward bias for transistors Q'-1 through Q'-6 and no collector current flows through these transistors so that they are in a so-called OFF condition. However, whenever control current flows, there is an output potential generated by one or more of the Hall units.

Considering the case where potential is applied to input terminals 110, 111, with terminal 111 being negative, and the motor shaft is so positioned that Hall effect generator 1' produces a potential at its output terminals 114, 115 of sufficient amplitude and correct polarity to drive Q'-1 into conduction, there is a complete current path extending from terminal 111 through diode CR'-1, the emitter-base circuit of transistor Q'-8, the emitter-base circuit of Q'-7, resistor R'-1, the collector-emitter circuit of Q'-1, conductor 116, Hall effect generator 1' between terminals 115 and 117, and resistor R'-16 to terminal 110. With current flowing the emitter-collector circuit of transistor Q'-1, transistors Q'-8 and Q'-9 act as closed switches to establish parallel current paths through the motor windings. One of these paths consists of motor windings 101, 102 and 103 connected in series while the other path consists of motor windings 104, 105 and 106 connected in series.

Transistors Q'-8 and Q'-9 are elements of transistor amplifier 125 which also includes transistor Q'-7. The emitter of transistor Q'-7 is connected through resistor R'-13 to terminal 113 and is also connected directly to the base of transistor Q'-8. The collector of transistor Q'-7 is connected through series connected resistors R'-15 and R'-14 to terminal 112. The juncture between resistors R'-14 and R'-15 is tied to the base of transistor Q'-9. The base of transistor Q'-7 is tied to the end of resistor R'-1 remote from the collector of transistor Q'-1 and is also connected through resistor R'-7 to negative terminal 113. Resistors R'-7, R'-13 and R'-14 provide a current leakage path around the emitter-base circuit for their associated transistors to stabilized operation thereof.

In addition to the amplifier 125 described in connection with the operation of transistor Q'-1, identical amplifiers are provided for each of the transistors Q'-2 through Q'-6.

As should be apparent to those skilled in the art transistors Q'-1 through Q'-6 function as sequentially operated switches for controlling current through the motor windings 101 through 106 to establish a rotating magnetic field.

Resistors R'-2 to R'-6 are associated with transistors Q'-2 through Q'-6, respectively, in the same manner that resistor R'-1 is associated with transistor Q'-1. Similarly, resistors R'-8 through R'-12 are associated with transistors Q'-2 through Q'-6, respectively in the same manner as resistor R'-7 is associated with transistor Q'-1.

It is noted that when the polarities at input terminals 110, 111 is reversed, the polarities at terminals 112, 113 remain the same so that the transistors will function properly. However, with a reversal of polarity between terminals 110, 111, the direction of the Hall effect generator control current is reversed. Under these circumstances, with the motor shaft in the position previously described in connection with operation of transistor Q'-1, the polarity of the potential at terminals 114, 115 of generator 1' will be reversed so transistor Q'-4 will conduct and transistor Q'-1 will not conduct until the motor shaft has rotated 180 degrees in which position flux will extend through the Hall effect generator in the opposite direction. Further, a change in polarity at terminals 110, 111 causes a reversal in rotor rotation.

It is noted that even though the input and output terminals of the Hall effect generator are not isolated within the device, the circuit of FIGURE 10 is such that Hall effect generator control current is obtained from the same D.C. source to which the amplifiers are directly coupled.

The emitter collector current of each of the transistors Q'-1 through Q'-6 is limited to a small percentage of the control current to minimize undesirable effects of unbalance in the output circuits of the Hall effect generators. Only base emitter current flows in one output terminal of a Hall effect generator, whereas base emitter current plus collector-emitter current flows in the other output terminal. Low collector emitter current is accomplished by the current limiting action of resistors R'-1 through R'-6 each of which is made large enough so that the voltage drop thereacross is much greater than the voltage drop across the associated transistor, this drop being almost as great as the supply voltage at a low current value. It has been found that satisfactory results are obtained if collector current is in the order of one percent of the control current. Resistor R–15 also performs a current limiting function and is of a magnitude such that a voltage drop thereacross approaches the supply voltage at the current required to drive transistors Q'–8 and Q'–9 into saturation. Transistor Q'–7 is chosen to saturate at a low collector-emitter voltage thereby permitting resistor R'–15 to be the controlling factor.

Thus, it is seen that the instant invention provides a novel construction for a direct current machine having the characteristics of a typical D.C. machine with brush type commutating means. The construction is such that all relatively moving commutating elements are physically spaced from each other so that switching signals are coupled through an air gap. Further, the construction is such that rotor position is detectible even with the rotor at standstill.

While the embodiments of FIGURES 1 through 5 has been illustrated as comprising a visible light source in conjunction with an apertured light shield, it is to be understood that this arrangement may be readily replaced by a construction in which a radio active element is imbedded in a portion of the rotor shaft. This portion of the shaft must then be constructed of a material offering high attenuation to the radiation from the imbedded element except that radiation may take place freely through an aperture in the shaft. In this embodiment, a number of radiation detectors are circularly arranged so that they are scanned by a radiation beam as the rotor rotates with these radiation detectors functioning in the manner of the photo sensitive devices of FIGURES 1 through 5.

In connection with FIGURES 1 through 5, it is to be understood that photo electric devices P–1 through P–6 may be used as switches directly feeding motor windings within the power handling capabilities of these photoelectric devices. However, for most practical applications, these photoelectric devices will be utilized to control amplifier stages which act as ON–OFF switches to operate at a power greater than the capacity of these photoelectric devices.

It is also to be understood that construction of the type previously described may readily be adapted to provide bi-directional drive as input polarities are reversed.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A D.C. powered motor comprising a stationary armature, a rotor surrounded by said armature, and commutating means for controlling energization of said armature; said commutating means including variable impedance elements and means, at least a portion of which is carried by said rotor and positioned physically remote from said elements for varying the impedance thereof in accordance with rotor position; and means active at a predetermined speed of said motor for synchronizing rotational speed thereof in accordance with synchronizing signals received from a source external to said motor.

2. A D.C. powered motor comprising a stationary armature, a rotor surrounded by said armature, and commutating means for controlling energization of said armature; said commutating means including variable impedance elements and means at least a portion of which is carried by said rotor and positioned physically remote from said elements for varying the impedance thereof in accordance with rotor position; said commutating means further including triggered devices in circuit with said variable impedance elements; and means in circuit with said triggered devices utilizing synchronizing signals received from a source external to said motor for controlling rotation of said motor at a speed synchronized to said signals.

3. The motor of claim 2 in which the commutating means includes saturable magnetic core reactors in circuit with said variable impedance elements; each of said reactors comprising a core carrying a first and a second winding, said devices and said reactors connected in circuit such that a synchronizing signal triggers one of said triggered devices causing a current to pass through said first winding of one reactor of a magnitude sufficient to saturate its core, the second winding of this reactor then acts as an open gate to route the next occurring synchronizing signal to trigger a succeeding triggered device into operation.

4. A construction of the class described comprising a plurality of connected assemblies each comprising a reactor and a triggered device; said reactor including a saturable magnetic core and a first and a second winding mounted to said core; a bus common to all of said assemblies; means for introducing triggering signals to said bus; each of said devices connected in circuit with the first winding of its associated reactor whereby a first signal which triggers this device into conduction causes current to pass through this first winding which saturates the core associated with this first winding thereby lowering the impedance of the second winding on this core so that this second winding now acts as an open gate to route the next succeeding signal to trigger the device of the next assembly.

5. A device of the class described comprising a D.C. supply, a torque producing unit, a static switching means and control means for operating said switching means; said unit including a rotor and a stator; said switching means operatively connected to said stator for controlling energization thereof; said control means including a portion mounted for rotation by said rotor; said portion being physically spaced from said switching means and operatively positioned to control operation thereof whereby predetermined parts of said stator are energized in accordance with rotor position; said switching means comprising a plurality of radiation sensitive elements and said portion constructed to control impingement of radiation upon said elements as a function of rotor position; said stator including a plurality of coil portions joined at a plurality of juncture points in a closed loop circuit, a first and a second section of said switching means each connecting said D.C. supply to a first and a second of said juncture points; said coil portions providing first and second parallel current paths between said first and said second juncture points; each of said sections including an individual single one of said radiation sensitive elements, said elements of said first and said second sections being spaced apart by 180°; each of said sections presenting a relatively low empedance to current flow from said supply through said stator upon impingement of radiation on their respective elements and essentially blocking said current flow under other conditions; said first section when presenting a relatively low impedance permitting current flow in one direction through said paths; said second section when presenting a relatively low impedance permitting current flow in reverse direction through said paths.

6. A device as set forth in claim 5 in which a third and a fourth section of said switching means each connects said D.C. supply to a third and a fourth of said juncture points; said coil portions providing third and fourth parallel current paths between said third and fourth juncture points; each of said third and fourth sections including an individual one of said radiation sensitive elements; said elements of said third and fourth sections being spaced apart by 180° and being angularly spaced from said element of said first and said second sections; each of said third and fourth sections presenting a relatively low impedance to current flow from said supply through said stator upon impingement of radiation on their respective elements and essentially blocking said this latter current flow under other conditions; said third section when presenting a relatively low impedance permitting current flow in one direction through said paths between said third and fourth junctures; said fourth section when presenting a relatively low impedance permitting current flow in reverse direction through said paths between said third and fourth junctures.

7. The device of claim 6 in which said elements are photo-sensitive and said portion comprises an apertured shield arranged to permit light rays to impinge upon selected ones of said elements in accordance with rotor position.

8. A device as set forth in claim 7 in which no more than two of said photo-sensitive elements are even partially illuminated by rays from the control means for all positions of said rotor.

9. The device of claim 5 in which said elements are photo-sensitive and said portion comprises an apertured shield arranged to permit light rays to impinge upon selected ones of said elements in accordance with rotor position.

References Cited
UNITED STATES PATENTS

| | | | |
|---|---|---|---|
| 3,132,294 | 5/1964 | Foote | 318—138 |
| 3,023,348 | 2/1962 | Cox | 318—480 X |
| 3,096,467 | 7/1963 | Angus | 318—480 X |

ORIS L. RADER, *Primary Examiner.*

C. E. ROHRER, T. LYNCH, *Assistant Examiners.*